United States Patent
Suzuki et al.

(10) Patent No.: US 11,514,787 B2
(45) Date of Patent: Nov. 29, 2022

(54) INFORMATION PROCESSING DEVICE, INFORMATION PROCESSING METHOD, AND RECORDING MEDIUM

(71) Applicant: TOYOTA JIDOSHA KABUSHIKI KAISHA, Toyota (JP)

(72) Inventors: Koichi Suzuki, Miyoshi (JP); Makoto Akahane, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 16/528,847

(22) Filed: Aug. 1, 2019

(65) Prior Publication Data

US 2020/0074858 A1 Mar. 5, 2020

(30) Foreign Application Priority Data

Sep. 4, 2018 (JP) .............................. JP2018-165474

(51) Int. Cl.
*G08G 1/123* (2006.01)
*G01C 21/36* (2006.01)

(52) U.S. Cl.
CPC ......... *G08G 1/123* (2013.01); *G01C 21/3605* (2013.01); *G01C 21/3691* (2013.01)

(58) Field of Classification Search
CPC . G08G 1/123; G01C 21/3605; G01C 21/3691
See application file for complete search history.

(56) References Cited

U.S. PATENT DOCUMENTS

| | | | | |
|---|---|---|---|---|
| 9,820,108 | B1* | 11/2017 | Inciong | H04L 67/55 |
| 2011/0022393 | A1* | 1/2011 | Waller | G06F 3/0447 |
| | | | | 704/E15.001 |
| 2012/0209506 | A1* | 8/2012 | Tamayama | G01C 21/3664 |
| | | | | 701/410 |
| 2014/0278086 | A1* | 9/2014 | San Filippo | G01C 21/3423 |
| | | | | 701/527 |
| 2014/0288821 | A1* | 9/2014 | Modica | G08G 1/123 |
| | | | | 701/465 |
| 2015/0045068 | A1* | 2/2015 | Softer | G01C 21/20 |
| | | | | 455/456.3 |
| 2016/0223337 | A1* | 8/2016 | Uno | G01C 21/20 |
| 2016/0362123 | A1* | 12/2016 | Schultz | B61L 27/14 |

(Continued)

FOREIGN PATENT DOCUMENTS

| | | |
|---|---|---|
| JP | 2009-098781 A | 5/2009 |
| JP | 2009-128117 A | 6/2009 |
| JP | 2014-215162 A | 11/2014 |

OTHER PUBLICATIONS

Partial Translation of Aug. 2, 2022 Notification of Reasons of Refusal issued in Japanese Patent Application No. 2018-165474.

(Continued)

*Primary Examiner* — Jonathan M Dager
(74) *Attorney, Agent, or Firm* — Oliff PLC (57) ABSTRACT

In an information processing device, a first acquirer acquires, from a user, plan information including a scheduled time and a destination. A second acquirer acquires a spare time. A third acquirer acquires travelling schedule information for enabling arrival at the destination earlier than the scheduled time by the spare time or more. A display controller displays, on a display unit, information regarding the travelling schedule information and the spare time.

7 Claims, 5 Drawing Sheets

(56) References Cited

U.S. PATENT DOCUMENTS

| | | | |
|---|---|---|---|
| 2017/0011637 A1* | 1/2017 | Woicekowski | G06Q 10/06 |
| 2017/0052036 A1* | 2/2017 | Uno | G01C 21/3492 |
| 2017/0059337 A1* | 3/2017 | Barker | G01C 21/343 |
| 2017/0200249 A1* | 7/2017 | Ullrich | G06Q 30/0631 |
| 2018/0136003 A1* | 5/2018 | Perkins | G01C 21/362 |
| 2018/0189682 A1* | 7/2018 | Seacat | G06Q 10/02 |
| 2018/0273064 A1* | 9/2018 | Brooks | B61L 27/0027 |
| 2019/0052728 A1* | 2/2019 | Cheng | H04L 67/535 |
| 2019/0236959 A1* | 8/2019 | Belapurkar | G08G 1/22 |
| 2019/0244522 A1* | 8/2019 | Makita | G06Q 10/02 |
| 2019/0293443 A1* | 9/2019 | Kelly | G01C 21/3492 |
| 2019/0294159 A1* | 9/2019 | Pedersen | G05D 1/0038 |
| 2019/0324600 A1* | 10/2019 | Wipperfurth | G06F 3/0484 |
| 2020/0159251 A1* | 5/2020 | Iwasaki | G06Q 10/20 |
| 2020/0175432 A1* | 6/2020 | Iwasaki | G06Q 50/30 |
| 2020/0250898 A1* | 8/2020 | Rafferty | B60H 1/00657 |
| 2020/0290644 A1* | 9/2020 | Sakurada | B60W 60/0021 |
| 2020/0327466 A1* | 10/2020 | Noda | G06Q 10/0833 |
| 2021/0190533 A1* | 6/2021 | Yamada | G08G 1/202 |

OTHER PUBLICATIONS

Nagasaka, "Selling Power," Prudential Life Insurance Company, p. 244, Jul. 19, 2018.

* cited by examiner

INFORMATION PROCESSING DEVICE, INFORMATION PROCESSING METHOD, AND RECORDING MEDIUM

The disclosure of Japanese Patent Application No. 2018-165474 filed on Sep. 4, 2018 including the specification, drawings and abstract is incorporated herein by reference in its entirety.

BACKGROUND

1. Technical Field

The present disclosure relates to a technology for supporting a user's action.

2. Description of Related Art

JP-A-2014-215162 discloses a schedule management system that sets a destination and a departure point based on location information in schedule data entered by a user, calculates a traveling route, calculates a traveling time and derives an estimated departure time such that the user arrives at the destination by the starting date and time of the plan, and resisters such data as schedule data.

Meanwhile, users may sometimes wish to allow sufficient time for their actions to arrive at their destinations earlier than the starting dates and times of their plans. However, in the technology of JP-A-2014-215162, the case of arriving earlier than the starting date and time of the plan is not considered.

SUMMARY

The present embodiment addresses the above-described issue, and a general purpose thereof is to provide an information processing device, an information processing method, and a recording medium for supporting an action of a user who allows sufficient time therefor.

In response to the above issue, an information processing device of one aspect of the present embodiment includes: a first acquirer configured to acquire, from a user, plan information including a scheduled time and a destination; a second acquirer configured to acquire a spare time; a third acquirer configured to acquire travelling schedule information for enabling arrival at the destination earlier than the scheduled time by the spare time or more; and a display controller configured to display, on a display unit, information regarding the travelling schedule information and the spare time.

According to this aspect, since information regarding the travelling schedule information and spare time is displayed, the user can easily recognize the pieces of information. Therefore, the user can allow sufficient time for his or her actions.

The third acquirer may determine an estimated departure time at a departure point, an estimated arrival time at the destination, and transportation such as to enable arrival at the destination earlier than the scheduled time by the spare time or more, and may acquire the estimated departure time, the estimated arrival time, and the transportation thus determined, as the travelling schedule information.

The second acquirer may acquire the spare time related to the user.

The plan information may include a plan attribute, and the second acquirer may acquire the spare time associated with the plan attribute.

The second acquirer may acquire the spare time associated with transportation from a departure point to a destination.

The information processing device may further include: a fourth acquirer configured to acquire position information of the user; a fifth acquirer configured to acquire an arrival time at which the user arrives at the destination, on the basis of the position information acquired at the fourth acquirer; and a deriver configured to derive the spare time for the user on the basis of the time between the arrival time acquired at the fifth acquirer and the scheduled time.

Another aspect of the present embodiment relates to an information processing method. The information processing method includes: acquiring, from a user, plan information including a scheduled time and a destination; acquiring a spare time; acquiring travelling schedule information for enabling arrival at the destination earlier than the scheduled time by the spare time or more; and displaying, on a display unit, information regarding the travelling schedule information and the spare time.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Various embodiments now will be described. The embodiments are illustrative and are not intended to be limiting.

Figure 1:
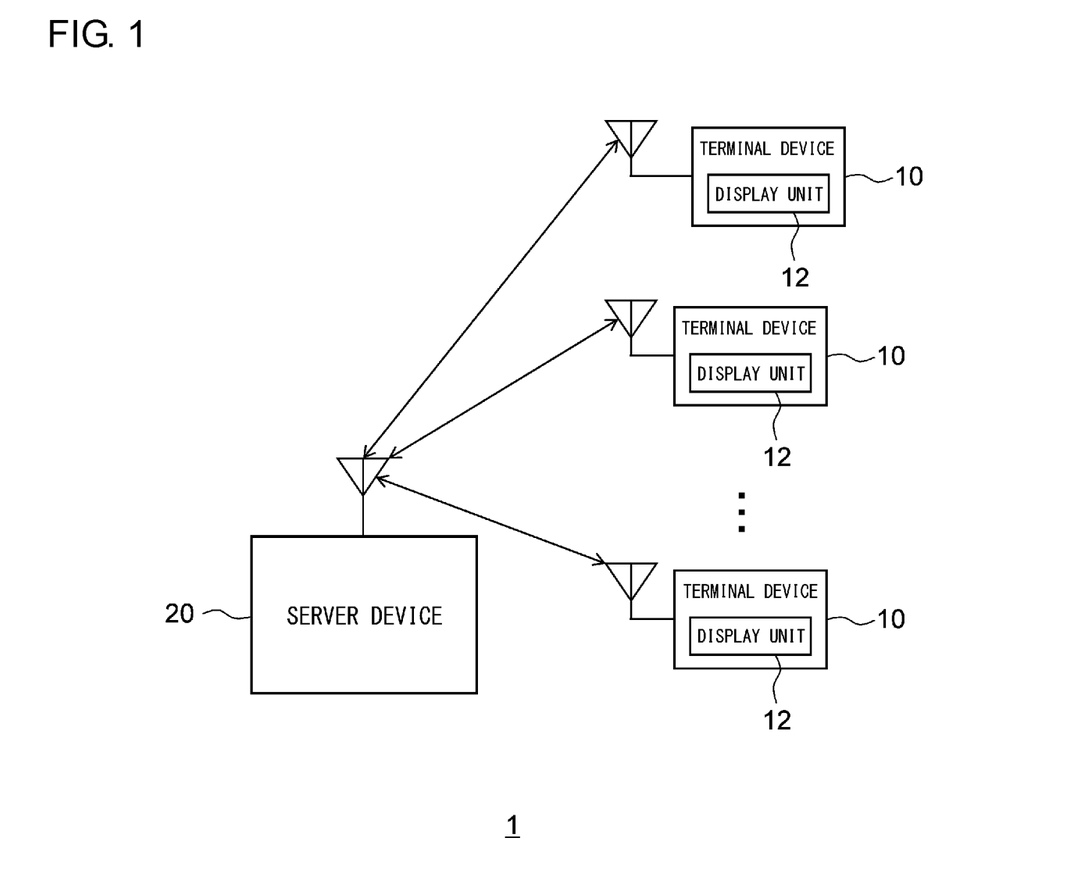
FIG. 1 is a block diagram that shows a configuration of an information processing system according to an embodiment.

FIG. 1 is a block diagram that shows a configuration of an information processing system 1 according to an embodiment. The information processing system 1 may also be referred to as a schedule management system for managing a user's schedule. The information processing system 1 includes multiple terminal devices 10 respectively used by different users, and a server device 20.

In the embodiment, when a user registers a scheduled plan, a scheduled time, a destination, and the like in a terminal device 10, the server device 20 derives an estimated departure time and the like based on a spare time for the user such that the user can arrive at the destination earlier than the scheduled time by the spare time. The spare time may also be referred to as a reserve time. The server device 20 then displays information regarding the estimated departure time thus derived, the spare time, and the like on a display unit 12 of the terminal device 10 of the user.

The terminal device 10 may be a portable device, such as a smartphone, cellular phone, tablet terminal, and notebook computer, carried by a user. The terminal device 10 may also be a vehicle-mounted device, such as a car navigation device mounted on an automobile. Also, multiple terminal devices 10, such as a portable device and a vehicle-mounted device, used by the same user may be provided, and, in this case, the multiple terminal devices 10 are synchronized to process information in common.

Each terminal device 10 performs wireless communication with the server device 20. The wireless communication standard is not particularly limited, and may be 3G (third-generation mobile communication system), 4G (fourth-generation mobile communication system), or 5G (fifth-generation mobile communication system), for example. Each terminal device 10 may perform wireless communication with the server device 20 via a base station, which is not illustrated. The server device 20 may be installed in a data center, for example, and functions as an information processing device for processing information transmitted from the terminal devices 10.

A terminal device 10 accepts multiple entries of plan information from a user. The plan information includes a date, scheduled time, finish time, scheduled plan, destination, and plan attribute. It is assumed that the user enters such information on a schedule screen displayed on the display unit 12 of the terminal device 10.

For example, if the user enters "ABC University" in characters as a destination into the terminal device 10, the terminal device 10 may display multiple destination candidates, such as "X1 Campus in ABC University" and "X2 Campus in ABC University", to identify the destination, and the user may select the destination from among the candidates. Alternatively, the destination may be specified on a displayed map.

The plan attribute may be, for example, "Relatively important work", "Relatively less important work", or "Pleasure". The plan attribute may be selected from multiple icons displayed on the terminal device 10, for example.

The plan information may include a departure point. When the plan information does not include a departure point, the destination in the preceding plan information on the same day is regarded as the departure point. When the plan information does not include a departure point and there is no preceding plan information on the same day, the user's house as set in advance is regarded as the departure point.

The terminal device 10 transmits the plan information thus entered, to the server device 20. The terminal device 10 also regularly transmits, to the server device 20, its own position information derived by a GPS receiver, which is not illustrated. To the information to be transmitted, information for identifying the user, such as a user ID, is attached.

Figure 2:
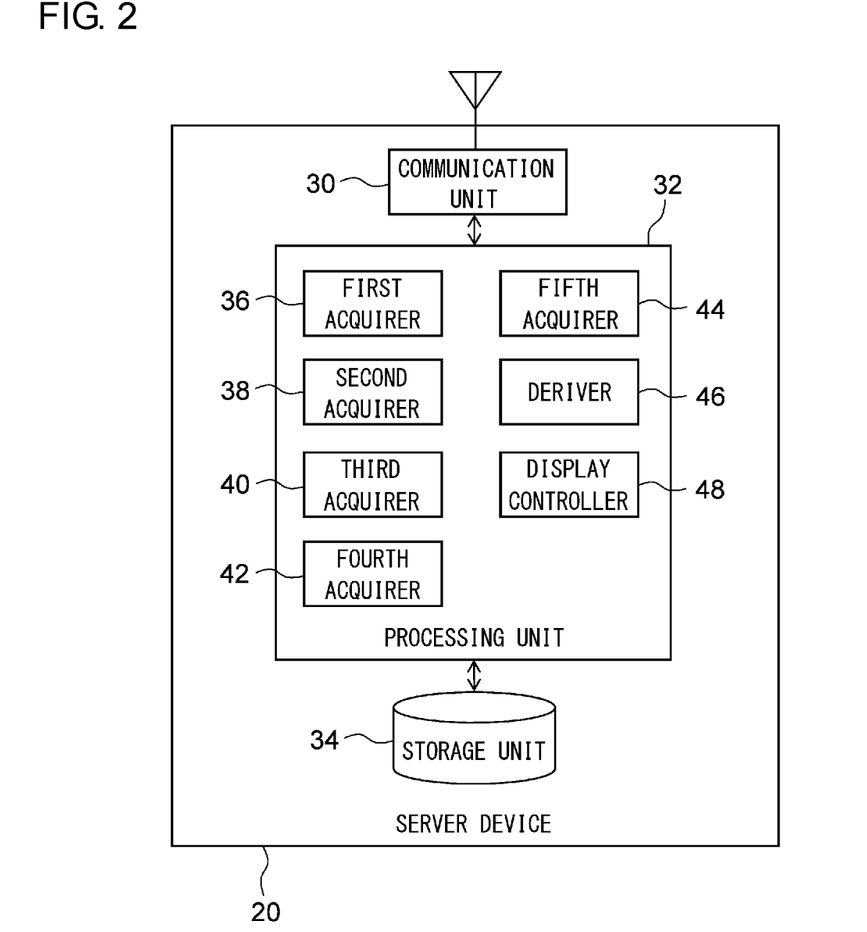
FIG. 2 is a block diagram that shows a configuration of a server device shown in FIG. 1.

FIG. 2 is a block diagram that shows a configuration of the server device 20 shown in FIG. 1. The server device 20 includes a communication unit 30, a processing unit 32, and a storage unit 34. The processing unit 32 includes a first acquirer 36, a second acquirer 38, a third acquirer 40, a fourth acquirer 42, a fifth acquirer 44, a deriver 46, and a display controller 48.

The configuration of the processing unit 32 may be implemented by a CPU or memory of any given computer, an LSI, or the like in terms of hardware, and by a memory-loaded program or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

The communication unit 30 performs wireless communication with each terminal device 10. The communication unit 30 receives plan information and position information from each terminal device 10. The communication unit 30 then outputs the plan information to the first acquirer 36, and outputs the position information to the fourth acquirer 42.

The first acquirer 36 acquires the plan information received at the communication unit 30. This corresponds to acquiring, by the first acquirer 36, the plan information from the user. The first acquirer 36 then outputs the plan information thus acquired to the third acquirer 40 and the display controller 48.

The storage unit 34 stores spare times related respectively to multiple users who have used the information processing system 1. The storage unit 34 stores, for each user, a spare time related to a plan attribute and a spare time related to transportation from a departure point to a destination. As described later, the spare times are derived based on the results of the user's arrival times at destinations.

For example, the storage unit 34 stores, for a user U1, 20 minutes as a spare time related to the plan attribute of "Relatively important work", 10 minutes as a spare time related to the plan attribute of "Relatively less important work", and 10 minutes as a spare time related to the plan attribute of "Pleasure". The storage unit 34 also stores, for the user U1, "+0%" as a spare time related to the transportation of "By train", and "+50%" as a spare time related to the transportation of "By car". In this example, the spare time for each transportation is represented as proportion of a time added to a spare time for a plan attribute, to the spare time for the plan attribute. The user U1 tends to have a relatively long spare time and is a type of user who allows sufficient time for his or her actions.

Meanwhile, for a user U2, the storage unit 34 stores, for example, one minute as the spare time related to the plan attribute of "Relatively important work", zero minutes as the spare time related to the plan attribute of "Relatively less important work", and zero minutes as the spare time related to the plan attribute of "Pleasure". The storage unit 34 also stores, for the user U2, "+0%" as the spare time related to the transportation of "By train", and "+0%" as the spare time related to the transportation of "By car". The user U2 tends to have a relatively short or no spare time and is a type of user who avoids wasting time.

The second acquirer 38 acquires, from the storage unit 34, spare times related to the user in the plan information acquired at the first acquirer 36. The second acquirer 38 then outputs the spare times thus acquired to the third acquirer 40.

When a user uses the information processing system 1 for the first time, since there is no spare time stored for the user, the second acquirer 38 is unable to acquire the spare times. Also, when a user has used the information processing system 1 only few times, the second acquirer 38 may be unable to acquire part of the spare times for the plan attributes and transportation. When the second acquirer 38 fails to acquire a spare time, the second acquirer 38 sets the spare time to zero.

For each piece of plan information output from the first acquirer 36, the third acquirer 40 acquires travelling schedule information for enabling arrival at the destination earlier than the scheduled time by the spare time or more. More specifically, the third acquirer 40 determines an estimated departure time at the departure point, an estimated arrival time at the destination, transportation, a traveling route, and a fee required for the traveling so that the user can arrive at the destination earlier than the scheduled time by the spare time or more. The third acquirer 40 may determine the transportation, traveling route, and the like such that the traveling time becomes shortest, for example. The third acquirer 40 uses, among spare times output from the second acquirer 38, the spare times related to the plan attribute and the transportation included in the plan information. For example, in the case of the user U1, if the plan attribute is "Relatively important work" and the transportation is "By car", the spare time to be used will be 20 minutes+10 minutes=30 minutes.

The third acquirer 40 acquires the estimated departure time, estimated arrival time, transportation, traveling route, and fee thus determined, as the travelling schedule information. The transportation includes by car, train, bus, and foot, for example. For the determination of the estimated departure time and the like, well-known technologies can be employed. The third acquirer 40 outputs, to the display controller 48, the travelling schedule information thus acquired and the spare time used for the acquisition of the travelling schedule information.

When the transportation is public transportation, such as by train and bus, and when the time between the estimated arrival time and the scheduled time is not equal to the spare time, the third acquirer 40 sets the time between the estimated arrival time and the scheduled time to the spare time or more and as short as possible.

The third acquirer 40 may determine the transportation based on the plan attribute. When the plan attribute is "Important work" or "Less important work" related to work, the third acquirer 40 may set the transportation to public transportation, without selecting a car. This can improve certainty of ensuring traveling time for a work-related plan.

The display controller 48 displays, on the display unit 12 of the terminal device 10, information regarding the travelling schedule information and spare time output from the third acquirer 40. More specifically, the display controller 48 outputs the information regarding the travelling schedule information and spare time to the communication unit 30, which then transmits the information to the terminal device 10. To the information to be transmitted, information for identifying the user is attached.

The terminal device 10 receives the information transmitted from the communication unit 30. The display unit 12 displays the information regarding the travelling schedule information and spare time with characters and images. The information regarding the travelling schedule information to be displayed includes the estimated departure time, estimated arrival time, and transportation, for example.

The transportation thus displayed may be changed in response to operation input from the user to the terminal device 10. When the transportation is changed, the terminal device 10 transmits information of the new transportation to the server device 20, the third acquirer 40 acquires new travelling schedule information based on the new transportation, and the display controller 48 displays information regarding the new travelling schedule information and spare time on the terminal device 10.

The user travels to the destination with reference to the information displayed on the display unit 12. If the user uses the information processing system 1 for the first time, for example, the displayed spare time will be zero, but the user may wish to arrive at the destination earlier than the scheduled time with time to spare. In this case, it is expected that the user will depart earlier than the estimated departure time displayed. Based on the results of the user's arrival times at destinations, the server device 20 learns the spare times as described below.

The fourth acquirer 42 acquires the position information of the user received at the communication unit 30. Based on the position information acquired at the fourth acquirer 42, the fifth acquirer 44 acquires the arrival time at which the user arrived at the destination included in the plan information.

With regard to each piece of plan information, the deriver 46 derives a spare time for the user based on the time between the arrival time acquired at the fifth acquirer 44 and the scheduled time included in the plan information. With regard to each user and to each plan attribute and transportation, the deriver 46 totals up the times between arrival times and scheduled times and performs statistical processing, such as averaging, on the total time, thereby deriving the spare time. The deriver 46 then stores, in the storage unit 34, the derived spare time related to the user and to the plan attribute or transportation. The spare times stored in the storage unit 34 are appropriately updated each time a user arrives at a destination.

Figure 3:
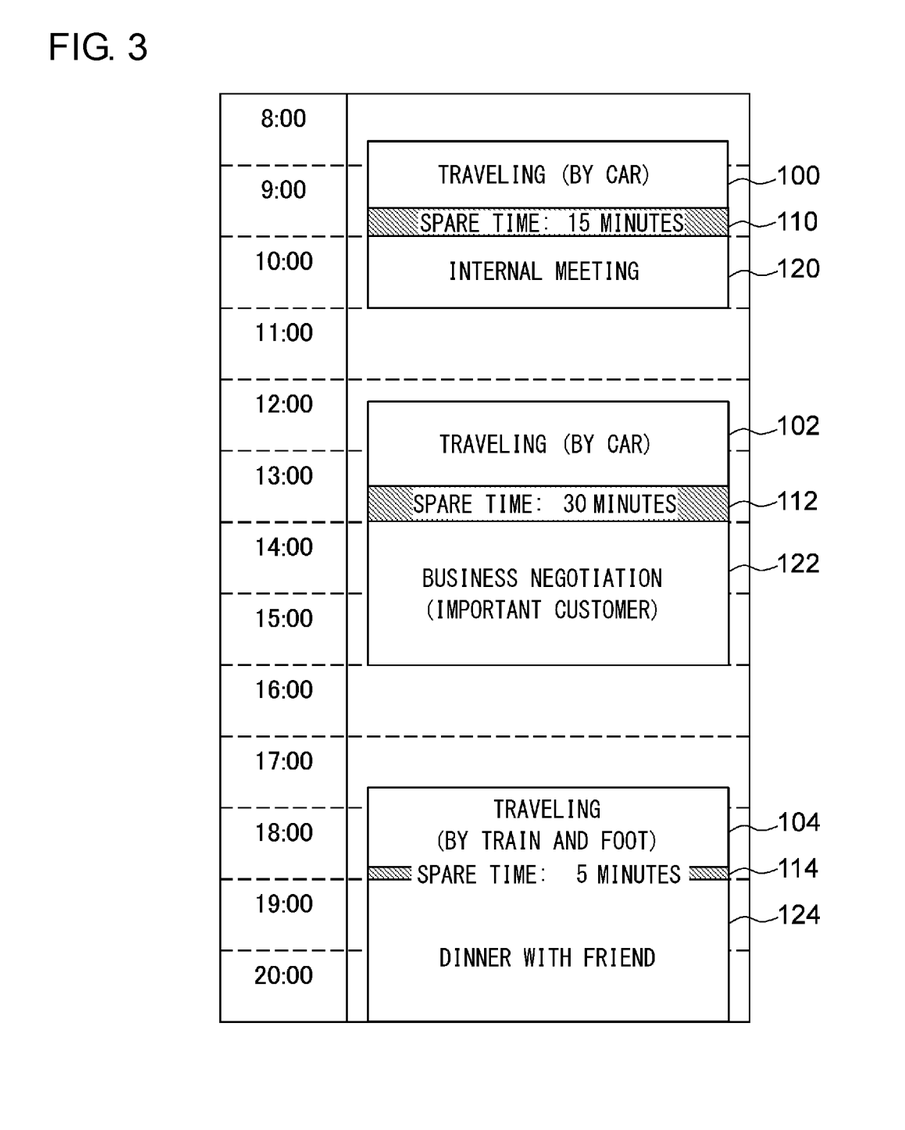
FIG. 3 is a diagram that shows an example of a schedule screen displayed on a display unit of a terminal device shown in FIG. 1.

FIG. 3 shows an example of a schedule screen displayed on the display unit 12 of a terminal device 10 shown in FIG. 1. FIG. 3 shows an example of the terminal device 10 of the user U1. The schedule screen shows a daily schedule and includes information 100, 102, 104 regarding the travelling schedule information, information 110, 112, 114 regarding the spare time, and information 120, 122, 124 regarding the plan information. These pieces of information are displayed along a time axis.

The information 120 regarding the plan information has been entered by the user U1 and shows that the scheduled time is 10:00, the finish time is 11:00, and the scheduled plan is "Internal meeting". In response to predetermined operation input to the terminal device 10, information currently not displayed, such as Company A as the destination and the plan attribute of "Relatively less important work", may also be displayed in characters, for example.

The information 100 regarding the travelling schedule information has been transmitted from the server device 20 and shows that the estimated departure time is 8:40, the estimated arrival time is 9:45, and the transportation is by car. In response to predetermined operation input, the traveling route and fee, currently not displayed, may also be displayed.

The information 110 regarding the spare time has been transmitted from the server device 20 and reflects traveling results of the user U1 in the past, and the information 110 shows that the spare time between the estimated arrival time and the scheduled time is 15 minutes.

The information 122 regarding the plan information shows that the scheduled time is 14:00, the finish time is 16:00, and the scheduled plan is "Business negotiation (important customer)". In response to predetermined operation input, Company B as the destination and the plan attribute of "Relatively important work" may also be displayed.

The information 102 regarding the travelling schedule information shows that the estimated departure time is 12:20, the estimated arrival time is 13:30, and the transportation is by car.

The information 112 regarding the spare time shows that the spare time is 30 minutes.

The information 124 regarding the plan information shows that the scheduled time is 19:00, the finish time is 21:00, and the scheduled plan is "Dinner with friend". In response to predetermined operation input, Restaurant C as the destination and the plan attribute of "Pleasure" may also be displayed.

The information 104 regarding the travelling schedule information shows that the estimated departure time is 17:40, the estimated arrival time is 18:55, and the transportation is by train and foot.

The information 114 regarding the spare time shows that the spare time is 5 minutes.

Thus, since the travelling schedule information is displayed separately from the spare time, the user can easily recognize the travelling schedule information provided to ensure the spare time.

Figure 4:
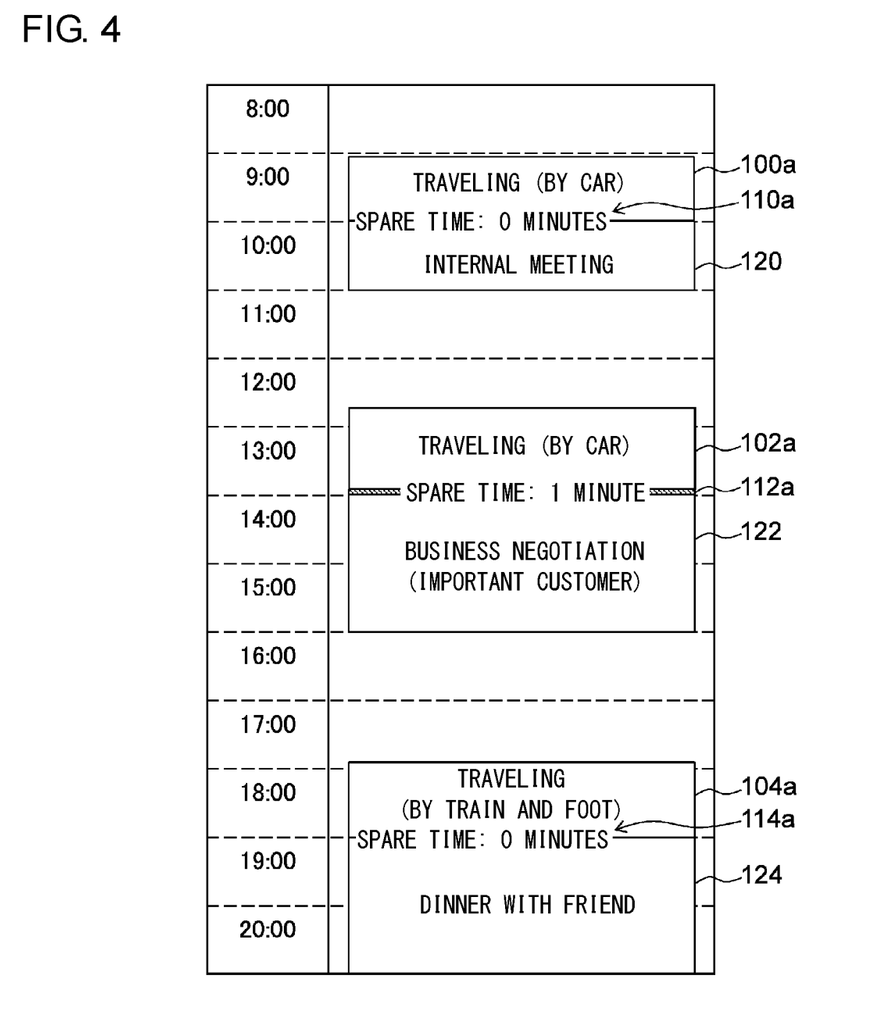
FIG. 4 is a diagram that shows another example of the schedule screen displayed on the display unit of a terminal device shown in FIG. 1.

FIG. 4 shows another example of the schedule screen displayed on the display unit 12 of a terminal device 10 shown in FIG. 1. FIG. 4 shows an example of the terminal device 10 of the user U2. The information 120, 122, 124 regarding the plan information is the same as that shown in FIG. 3, but the information 110a, 112a, 114a regarding the spare time is different from the corresponding information in FIG. 3, so that the information 100a, 102a, 104a regarding the travelling schedule information is also different from the corresponding information in FIG. 3.

Figure 5:
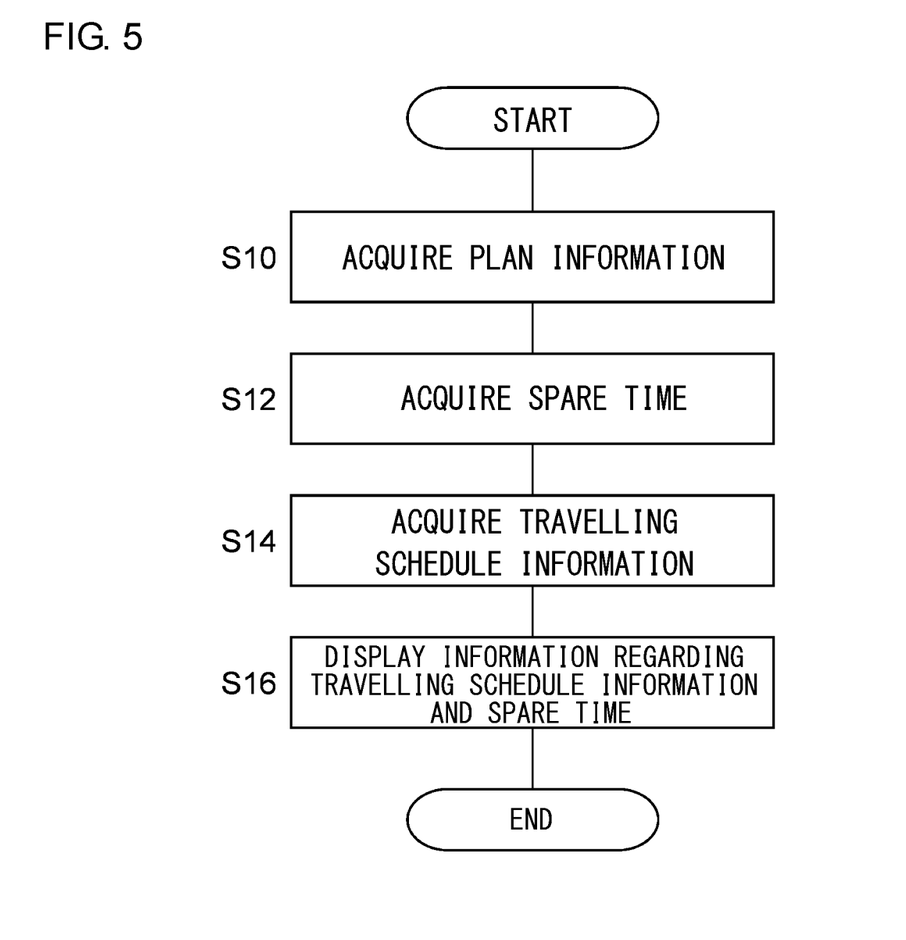
FIG. 5 is a flowchart that shows processing performed in the server device shown in FIG. 1.

There will now be described the overall operation of the information processing system 1 having the configuration set forth above. FIG. 5 is a flowchart that shows processing performed in the server device 20 shown in FIG. 1.

The first acquirer 36 acquires plan information of a user from a terminal device 10 (S10). The second acquirer 38 acquires a spare time related to the user (S12). For each piece of plan information, the third acquirer 40 acquires travelling schedule information for enabling arrival at the destination earlier than the scheduled time by the spare time or more (S14). The display controller 48 displays, on the display unit 12 of the terminal device 10, information regarding the travelling schedule information and the spare time (S16).

According to the present embodiment, since the terminal device 10 displays information regarding the travelling schedule information, spare time, and plan information, the user can easily recognize the pieces of information. This can support an action of a user who allows sufficient time therefor.

Since a spare time related to a user is acquired, the travelling schedule information and the spare time based on the user's preference can be provided. Also, since a spare time associated with a plan attribute is acquired, the travelling schedule information and the spare time based on the importance of the plan can be provided. Further, since a spare time associated with transportation is acquired, even in the case of transportation that may cause uncertainty in the estimated arrival time, such as by car, the travelling schedule information and the spare time can be provided more appropriately.

Further, since a spare time for a user is derived based on the time between the user's arrival time at a destination and a scheduled time, information on how much time to spare the user tends to arrive at a destination with can also be gathered. Therefore, a spare time appropriate for a user can be automatically provided, without the need for the user to set the spare time by himself or herself, thereby improving the user's convenience.

Described above is an explanation based on exemplary embodiments. The embodiments are intended to be illustrative only, and it will be obvious to those skilled in the art that various modifications to a combination of constituting elements or processes could be developed and that such modifications also fall within the scope of the present disclosure.

Although an example has been described in the embodiment in which the deriver 46 derives a spare time, a user may enter a spare time into the terminal device 10, and the spare time thus entered may be stored in the storage unit 34 of the server device 20. In this modification, since the user enters a desired spare time in advance, travelling schedule information can be provided in view of the spare time, without the learning.

The data structure of a spare time stored in the storage unit 34 is not particularly limited, and a spare time may be related to a pair of a plan attribute and transportation. For example, the spare time of 30 minutes may be related to the plan attribute of "Relatively important work" and the transportation of "By car", and the spare time of 20 minutes may be related to the plan attribute of "Relatively important work" and the transportation of "By train". This modification allows greater flexibility in the configuration of the server device 20.

The plan information may include the name of a person the user is going to meet, and a spare time may be related to the name of the person. This modification can provide a spare time associated with a person the user is going to meet.

Although an example has been described in the embodiment in which the first acquirer 36, second acquirer 38, third acquirer 40, fourth acquirer 42, fifth acquirer 44, deriver 46, and display controller 48 are provided in the server device 20, these may be provided in a terminal device 10. In this case, the first acquirer 36 acquires plan information entered by a user, and the second acquirer 38 acquires a spare time from a storage unit of the server device 20 or of the terminal device 10. Also, the third acquirer 40 acquires travelling schedule information from the server device 20, and the display controller 48 displays information regarding the travelling schedule information and spare time on the display unit 12. In this case, the terminal device 10 functions as an information processing device. This modification can simplify the configuration of the server device 20 and allow greater flexibility in the configuration of the information processing system 1.

What is claimed is:

1. An information processing device, comprising:
a processor programmed to function as:
a first acquirer configured to acquire, from a user, plan information including a scheduled time and a destination;
a second acquirer configured to acquire a spare time, the spare time being variable and being automatically determined, by the second acquirer based upon a predetermined criteria including an importance of a plan attribute included in the plan information;
a third acquirer configured to take into consideration the acquired spare time and to use the acquired spare time to determine a travelling schedule information to enable arrival at the destination earlier than the scheduled time by the spare time or more; and
a display controller configured to display, on a display unit, information regarding the travelling schedule information and the spare time.

2. The information processing device of claim 1, wherein the third acquirer determines an estimated departure time at a departure point, an estimated arrival time at the destination, and transportation so as to enable arrival at the destination earlier than the scheduled time by the spare time or more, and acquires the estimated departure time, the estimated arrival time, and the transportation thus determined, as the travelling schedule information.

3. The information processing device of claim 1, wherein the second acquirer acquires the spare time related to the user.

4. The information processing device of claim 1, wherein the second acquirer acquires the spare time associated with transportation from a departure point to a destination.

5. The information processing device of claim 1, wherein the processor is further configured to function as:
   a fourth acquirer configured to acquire position information of the user;
   a fifth acquirer configured to acquire an arrival time at which the user arrives at the destination, on the basis of the position information acquired at the fourth acquirer; and
   a deriver configured to derive the spare time for the user on the basis of the time between the arrival time acquired at the fifth acquirer and the scheduled time.

6. An information processing method, comprising:
   acquiring, from a user, plan information including a scheduled time and a destination, the acquiring being performed by a processor;
   acquiring, using the processor, a spare time, the spare time being variable and being automatically determined, by the processor, based upon a predetermined criteria including an importance of a plan attribute included in the plan information;
   acquiring, using the processor, travelling schedule information by taking into consideration the acquired spare time and using the acquired spare time to determine the travelling schedule information to enable arrival at the destination earlier than the scheduled time by the spare time or more; and
   displaying, on a display unit, information regarding the travelling schedule information and the spare time.

7. A non-transitory computer-readable medium encoded with a program having instructions to cause a computer to:
   acquire, from a user, plan information including a scheduled time and a destination;
   acquire a spare time, the spare time being variable and being automatically determined, by a processor, based upon a predetermined criteria including an importance of a plan attribute included in the plan information;
   acquire travelling schedule information by taking into consideration the acquired spare time and using the acquired spare time to determine the travelling schedule information to enable arrival at the destination earlier than the scheduled time by the spare time or more; and
   display, on a display unit, information regarding the travelling schedule information and the spare time.

* * * * *